(12) United States Patent
Yoshida

(10) Patent No.: US 12,024,078 B2
(45) Date of Patent: Jul. 2, 2024

(54) SEAT BACK FRAME FOR AUTOMOBILE AND METHOD FOR MANUFACTURING THE SAME

(71) Applicant: KOBE STEEL, LTD., Hyogo (JP)

(72) Inventor: Masatoshi Yoshida, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 0 days.

(21) Appl. No.: 17/930,449

(22) Filed: Sep. 8, 2022

(65) Prior Publication Data

US 2023/0098914 A1 Mar. 30, 2023

(30) Foreign Application Priority Data

Sep. 27, 2021 (JP) .................................. 2021-156884

(51) Int. Cl.
*B60N 2/68* (2006.01)
(52) U.S. Cl.
CPC ...................................... *B60N 2/68* (2013.01)
(58) Field of Classification Search
CPC ........................................................ B60N 2/68
See application file for complete search history.

(56) References Cited

U.S. PATENT DOCUMENTS

| | | | | |
|---|---|---|---|---|
| 6,869,145 B2 * | 3/2005 | Matsunuma | ........... | B60N 2/682 297/483 |
| 7,677,669 B2 * | 3/2010 | Blankart | ................ | B60N 2/682 297/452.2 |
| 7,887,139 B2 * | 2/2011 | Yamada | ................... | B60R 22/26 297/452.2 |
| 8,132,862 B2 * | 3/2012 | Yamada | ................. | B60N 2/682 297/216.13 |
| 8,926,022 B2 * | 1/2015 | Watanabe | ............... | B21D 53/88 297/452.2 |
| 10,562,136 B2 * | 2/2020 | Yamamoto | ............. | B21D 53/88 |
| 2014/0375106 A1 * | 12/2014 | Yamada | ................. | B60N 2/682 297/452.18 |
| 2016/0339821 A1 * | 11/2016 | Akaike | .................... | B60N 2/68 |
| 2017/0313226 A1 * | 11/2017 | Akaike | .................. | B60N 2/682 |
| 2018/0086242 A1 | 3/2018 | Suzuki et al. | | |

(Continued)

FOREIGN PATENT DOCUMENTS

| | | | | | |
|---|---|---|---|---|---|
| CN | 103991399 A | * | 8/2014 | ............... | B60N 2/22 |
| CN | 106414162 A | * | 2/2017 | ............... | B60N 2/22 |

(Continued)

*Primary Examiner* — Timothy J Brindley
(74) *Attorney, Agent, or Firm* — Studebaker & Brackett PC

(57) ABSTRACT

A seat back frame for automobile includes a first side frame and a second side frame that are arranged apart from each other in a vehicle width direction, an upper frame that connects an upper end portion of the first side frame and an upper end portion of the second side frame, and an upper bracket that is attached to the upper end portion of the first side frame and guides a seat belt. The first side frame is an extruded material extending in a vehicle vertical direction, and has a fixed lower end portion. The first side frame has a closed cross-section portion in a cross-section perpendicular to the vehicle vertical direction. The upper end portion of the first side frame is crushed rearward of a vehicle, and a thickness of the upper end portion in a vehicle front-rear direction is smaller than that of the lower end portion.

18 Claims, 9 Drawing Sheets

(56) References Cited

U.S. PATENT DOCUMENTS

2020/0070698 A1* 3/2020 Kamiya ................. B60N 2/682
2021/0138945 A1* 5/2021 Yamaguchi ............ B60N 2/682

FOREIGN PATENT DOCUMENTS

| CN | 115848248 | A | * | 3/2023 | ............... B60N 2/68 |
| CN | 115871536 | A | * | 3/2023 | ............... B60N 2/68 |
| JP | 2011000959 | A | * | 1/2011 | ............... B60N 2/68 |
| JP | 2015-101286 | A | | 6/2015 | |
| JP | 2015-221586 | A | | 12/2015 | |
| JP | 2017-114423 | A | | 6/2017 | |
| JP | 2017197081 | A | * | 11/2017 | ............. B21C 23/14 |
| JP | 2018-052257 | A | | 4/2018 | |
| JP | 2021123293 | A | * | 8/2021 | ............. B60N 2/68 |
| WO | WO-2014045952 | A1 | * | 3/2014 | ............... B60N 2/22 |
| WO | WO-2019058854 | A1 | * | 3/2019 | ............... B60N 2/42 |
| WO | WO-2022039426 | A1 | * | 2/2022 | |

* cited by examiner

SEAT BACK FRAME FOR AUTOMOBILE AND METHOD FOR MANUFACTURING THE SAME

CROSS-REFERENCE TO RELATED APPLICATIONS

This application claims priority of Japanese Patent Application No. 2021-156884 filed on Sep. 27, 2021, the contents of which are incorporated herein by reference.

BACKGROUND OF THE INVENTION

Field of the Invention

The present disclosure relates to a seat back frame for automobile and a method for manufacturing the seat back frame for automobile.

Description of Related Art

In the seat back frame for automobile, a structure incorporating a seat belt is known. In such a structure, a large load is applied to the seat back frame via the seat belt when the automobile suddenly decelerates or collides. Therefore, in order to suppress occurrence of buckling deformation, a seat back frame having high load-bearing performance is required.

JP 2015-101286 A discloses a seat back frame for automobile having high load-bearing performance. In the seat back frame, a side frame has a closed cross-sectional shape, and exhibits high load-bearing performance. Further, by curving and partially cutting off an upper portion of the seat back frame rearward of a vehicle, a large space above a seat surface is secured, and it is easy to get on and off the vehicle.

SUMMARY OF THE INVENTION

In the seat back frame of JP 2015-101286 A, it is necessary to cut off a part of the side frame having a closed cross-sectional shape. Such processing is complicated and difficult in terms of manufacturing process, and is preferably omitted. Therefore, there is room for improvement from the viewpoint of simple production.

An object of the present disclosure is to provide a structure that can be easily manufactured while having high load-bearing performance, in a seat back frame for automobile having a built-in seat belt and a method for manufacturing the seat back frame for automobile.

A first aspect of the present disclosure provides a seat back frame for automobile including: a first side frame and a second side frame that are arranged apart from each other in a vehicle width direction; an upper frame that connects an upper end portion of the first side frame and an upper end portion of the second side frame; and an upper bracket that is attached to the upper end portion of the first side frame and guides a seat belt, in which the first side frame is an extruded material extending in a vehicle vertical direction, and has a fixed lower end portion, the first side frame has a closed cross-section portion in a cross-section perpendicular to the vehicle vertical direction, and the upper end portion of the first side frame is crushed rearward of a vehicle, and a thickness of the upper end portion of the first side frame in a vehicle front-rear direction is smaller than that of the lower end portion of the first side frame.

According to this configuration, since the first side frame has the closed cross-section portion, the first side frame has high load-bearing performance. Further, since the upper end portion of the first side frame is crushed rearward of the vehicle, it is possible to secure a large space above the seat surface and to easily get on and off the vehicle. Furthermore, the lower end portion of the first side frame is fixed, the upper bracket that guides the seat belt is disposed at the upper end portion. When a high load is applied in a substantially forward direction of the vehicle through the upper bracket during a sudden deceleration or collision of the automobile, a relatively high bending moment is applied to the lower end portion, and a relatively low bending moment is applied to the upper end portion. Since the upper end portion is crushed rearward of the vehicle and the upper end portion is smaller than the lower end portion, section modulus of the lower end portion can be made larger than that of the upper end portion, and required load-bearing performance can be efficiently ensured.

The closed cross-section portion may include a pair of side walls arranged apart from each other in the vehicle width direction, and the pair of side walls may be folded inward of the closed cross-section portion along with the crushing at the upper end portion of the first side frame.

According to this configuration, appearance of the first side frame can be maintained, and shape layout required in design can be easily satisfied. In addition, even if the load is applied when the automobile suddenly decelerates or collides, the pair of side walls support each other, so that high load-bearing performance can be ensured.

Each of the pair of side walls may have a groove portion recessed inward of the closed cross-section portion at the lower end portion of the first side frame.

According to this configuration, since the first side frame is the extruded material, the upper end portion and the lower end portion are formed in the same shape during extruding. In the above configuration, since the groove portion is provided at the lower end portion, the groove portion is also provided at the upper end portion before being crushed. With such a groove portion, the upper end portion can be easily crushed, and unintended deformation can be suppressed.

A plurality of through-holes may be provided at central portions of the pair of side walls in the vehicle front-rear direction.

According to this configuration, the weight can be reduced by providing the plurality of through-holes. Further, since the plurality of through-holes can disperse the load as compared with a case where one continuous hole is provided, high load-bearing performance can be exhibited. Further, the plurality of through-holes also contribute to facilitating crushing at the upper end portion. Furthermore, when the load is applied to the first side frame through the upper bracket during sudden deceleration or collision of the automobile, bending deformation may occur in the first side frame. However, since the central portions of the pair of side walls in the vehicle front-rear direction are located in the vicinity of a neutral axis in the bending deformation, stresses generated in the central portions can be small, and it is possible to suppress a decrease in strength even when the plurality of through-holes are provided.

The plurality of through-holes may be arranged at a higher density toward an upper side of the vehicle.

According to this configuration, section modulus of the lower portion is made larger than that of the upper portion, and the required load-bearing performance can be efficiently ensured.

The closed cross-section portion may include a rear portion, a front portion, and an intermediate portion in descending order of size in the vehicle width direction at the lower end portion of the first side frame, and the closed cross-section portion may not have the intermediate portion at the upper end portion of the first side frame, and may have the front portion and the rear portion that are welded.

According to this configuration, since the upper end portion can be crushed so as to press the front portion against the rear portion in the manufacturing process, crushing processing and the subsequent welding processing can be easily performed.

A second aspect of the present disclosure provides a method for manufacturing a seat back frame for automobile including a first side frame and a second side frame that are arranged apart from each other in a vehicle width direction, an upper frame connecting an upper end portion of the first side frame and an upper end portion of the second side frame, and an upper bracket attached to the upper end portion of the first side frame and guiding a seat belt, the method including: extruding the first side frame so as to have a closed cross-section portion in a cross-section perpendicular to a vehicle vertical direction; and crushing the upper end portion of the first side frame rearward of a vehicle, to make a thickness of the upper end portion of the first side frame in a vehicle front-rear direction smaller than that of a lower end portion of the first side frame.

According to this method, as described above, in the method for manufacturing the seat back frame for automobile having a built-in seat belt, it is possible to provide a structure that can be easily manufactured while having high load-bearing performance.

The closed cross-section portion may have a pair of side walls arranged apart from each other in the vehicle width direction, and in the extruding, a groove portion recessed inward of the closed cross-section portion may be formed in the pair of side walls.

According to this method, since the pair of side walls are provided with initial irregularity directed inward of the closed cross-section portion, it is possible to suppress the pair of side walls from being bent outward of the closed cross-section portion when the upper end portion is crushed.

The method for manufacturing the seat back frame for automobile may further includes: forming an opening increasing in opening amount toward an upper side of the vehicle in the upper end portion of the first side frame; and continuously welding the opening so as to close the opening after the crushing.

According to this method, the weight can be reduced by forming the opening. In addition, since the opening amount of the opening is adjusted so that the section modulus is higher toward a lower side of the vehicle, the required load-bearing performance can be efficiently ensured. Note that even when the opening is closed by welding, weight reduction and high load-bearing performance are provided. Here, continuous welding means welding linearly instead of welding in points as in spot welding.

According to the present disclosure, in a seat back frame for automobile having a built-in seat belt and a method for manufacturing the seat back frame for automobile, a structure that can be easily manufactured while having high load-bearing performance can be provided.

DETAILED DESCRIPTION OF THE PREFERRED EMBODIMENT

Hereinafter, embodiments of the present disclosure will be described with reference to the accompanying drawings.

Figure 1:
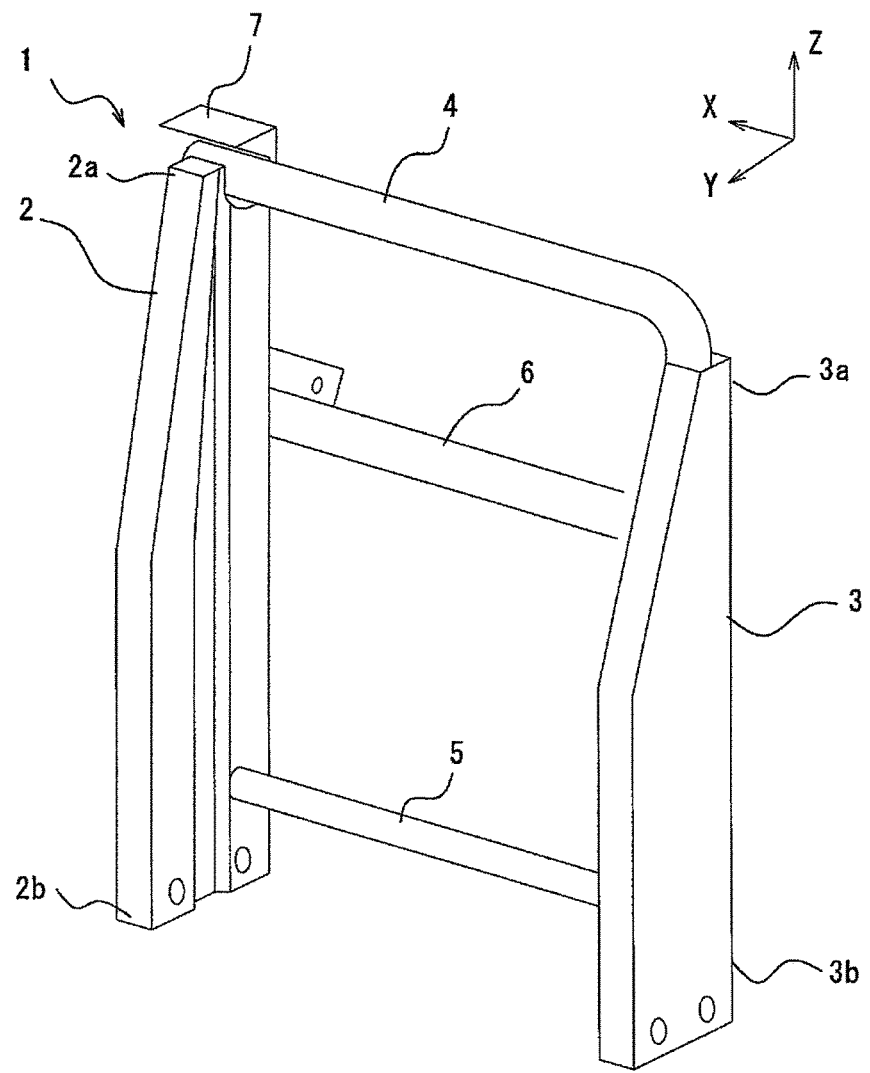
FIG. 1 is a perspective view of a seat back frame for automobile according to an embodiment of the present disclosure.

FIG. 1 is a perspective view of a seat back frame 1 for automobile according to an embodiment of the present disclosure. In FIG. 1, an outward direction in a vehicle width direction is indicated by a reference sign X, a forward direction in a vehicle front-rear direction is indicated by a reference sign Y, and an upward direction in a vehicle vertical direction is indicated by a reference sign Z.

A seat back frame 1 includes a first side frame 2 and a second side frame 3 that are arranged apart from each other in the vehicle width direction. The first side frame 2 and the second side frame 3 extend in the vehicle vertical direction. The first side frame 2 is disposed outside in the vehicle width direction, and the second side frame 3 is disposed inside in the vehicle width direction.

The seat back frame 1 includes an upper frame 4 that connects an upper end portion 2a of the first side frame 2 and an upper end portion 3a of the second side frame 3. Further, the seat back frame 1 includes a lower frame 5 that connects a lower end portion 2b of the first side frame 2 and a lower end portion 3b of the second side frame 3. Further, the seat back frame 1 includes a midframe 6 that connects a central portion of the first side frame 2 and a central portion of the second side frame 3. In the present embodiment, the upper frame 4, the lower frame 5, and the midframe 6 are circular tube members made of aluminum alloy extending in the vehicle width direction. Note that in the present embodiment, the second side frame 3 and the upper frame 4 are formed as separate components, but the present disclosure is not limited to this structure, and the second side frame 3 and the upper frame 4 may be integrated.

The seat back frame 1 is a seat belt built-in type, and includes a retractor (not illustrated) that winds a seat belt and an upper bracket 7 that guides the seat belt. The upper bracket 7 is attached to the upper end portion 2a of the first side frame 2 and an outer end portion of the upper frame 4 in the vehicle width direction. Further, the retractor is attached to the upper bracket 7. Note that the retractor may be attached to, for example, the midframe 6. In this case, the seat belt extends forward from behind the seat back frame 1 via the upper bracket 7.

Figure 2:
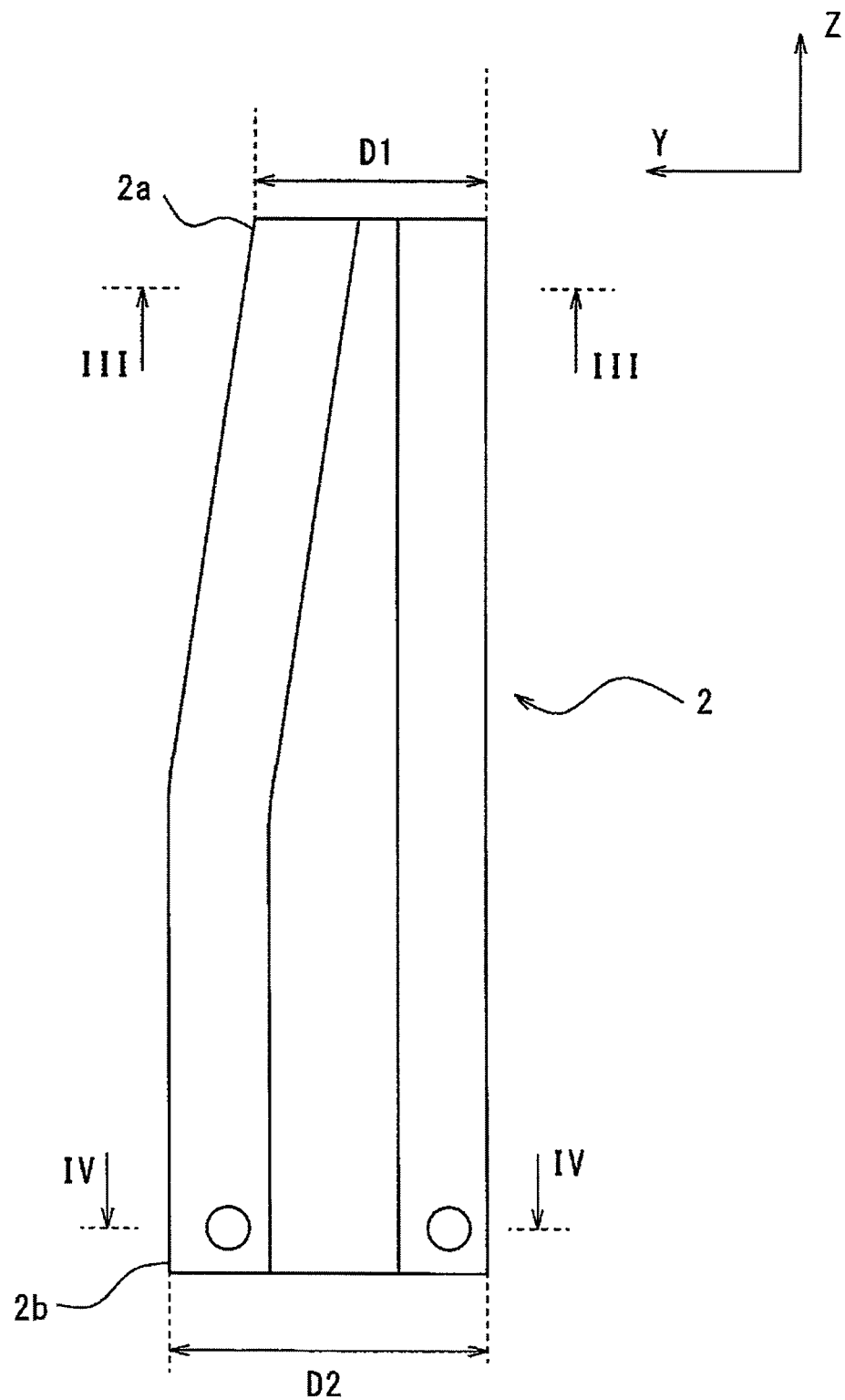
FIG. 2 is a side view of a first side frame.
Figure 3:
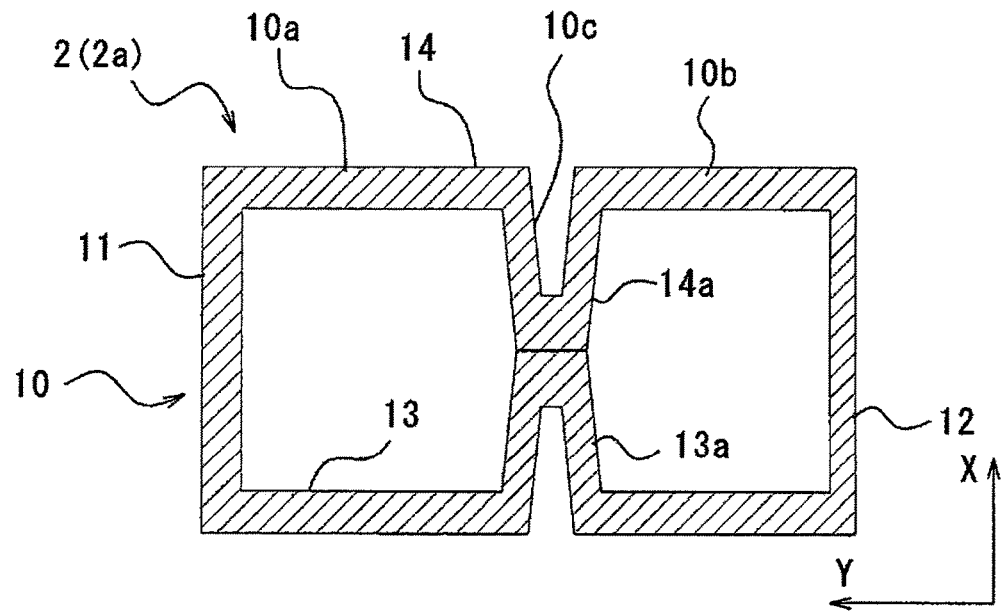
FIG. 3 is a cross-sectional view taken along line III-III of FIG. 2.
Figure 4:
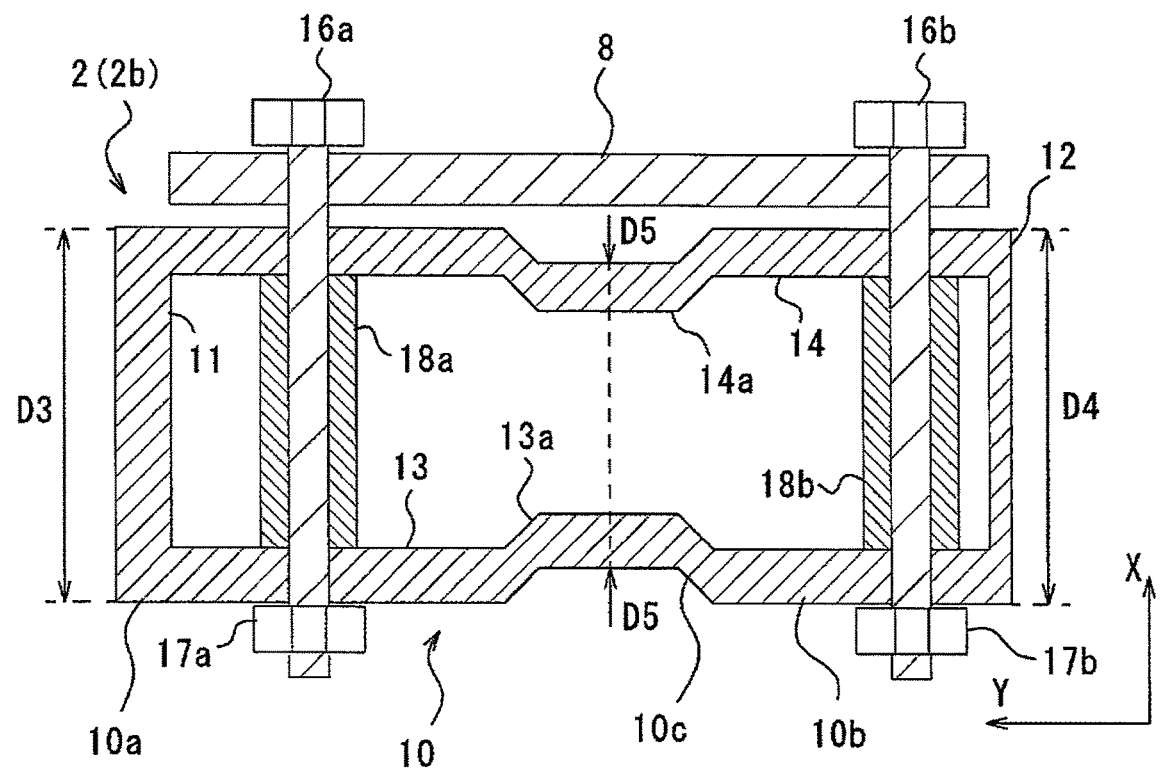
FIG. 4 is a cross-sectional view taken along line IV-IV of FIG. 2.

FIG. 2 illustrates a side view of the first side frame 2. FIG. 3 illustrates a cross-sectional view taken along line of FIG. 2. FIG. 4 illustrates a cross-sectional view taken along line IV-IV of FIG. 2.

The first side frame 2 is an extruded material extending in the vehicle vertical direction. In the present embodiment, the first side frame 2 is an extruded material made of aluminum alloy. The lower end portion 2b of the first side frame 2 is fixed to a seat cushion frame (not illustrated) via a recliner 8.

The upper end portion 2a of the first side frame 2 is crushed rearward of a vehicle. In the present embodiment, not only the upper end portion 2a but also substantially an upper half of the first side frame 2 is crushed rearward of the vehicle, and is crushed more largely toward an upper side of the vehicle. Further, the lower end portion 2b of the first side frame 2 is not crushed, and maintains a shape at the time of extruding. Thus, a thickness of the upper end portion 2a in the vehicle front-rear direction is smaller than that of the lower end portion 2b (D1<D2 in FIG. 2).

The first side frame 2 has a closed cross-section portion 10 in a cross-section perpendicular to the vehicle vertical direction. In the present embodiment, the closed cross-section portion 10 includes a front wall 11 located on the front of the vehicle, a rear wall 12 located on the rear of the vehicle, and a pair of side walls 13 and 14 connecting the front wall 11 and the rear wall 12. The pair of side walls 13 and 14 are arranged to face each other in the vehicle width direction. The pair of side walls 13 and 14 respectively have groove portions 13a and 14a having a shape recessed inward of the closed cross-section portion 10 at the lower end portion 2b.

In the present embodiment, in the closed cross-section portion 10, a front portion 10a located on the front side of the vehicle, a rear portion 10b located on the rear side of the vehicle, and an intermediate portion 10c (the groove portions 13a and 14a) therebetween are provided. The front portion 10a and the rear portion 10b are equal in size in the vehicle width direction (in FIG. 4, D3=D4), and the intermediate portion 10c is smaller in size in the vehicle width direction than the front portion 10a and the rear portion 10b (D5<D3, D4 in FIG. 4).

The pair of side walls 13 and 14 are folded inward of the closed cross-section portion 10 along with the crushing at the upper end portion 2a (see FIG. 3). That is, the intermediate portion 10c (groove portions 13a and 14a) is contracted in the vehicle front-rear direction and is formed deeply inward of the closed cross-section portion 10. In the intermediate portion 10c (groove portions 13a and 14a), the folded pair of side walls 13 and 14 contact each other and support each other. Note that in the intermediate portion 10c (groove portions 13a and 14a), the folded pair of side walls 13 and 14 may not contact each other but may be separated from each other, and when they are brought into contact with each other as in the present embodiment, for example, they may be bonded with an adhesive.

In the present embodiment, the first side frame 2 is fastened to the recliner 8 by bolts 16a and 16b and nuts 17a and 17b. The bolts 16a and 16b respectively pass through the front portion 10a and the rear portion 10b of the closed cross-section portion 10 in the vehicle width direction, and are respectively coated with collars 18a and 18b in the closed cross-section portion 10. The collars 18a and 18b support the side walls 13 and 14 in the vehicle width direction.

Referring to FIG. 1, the second side frame 3 is made of high-tension steel and has a plate shape. The second side frame 3 is bent at a right angle at two positions when viewed in the vehicle vertical direction, that is, the second side frame 3 is formed in a substantially C-shape. The second side frame 3 has the lower end portion 3b larger than the upper end portion 3a in the vehicle front-rear direction.

Next, a method for manufacturing the seat back frame 1 for automobile will be described. Hereinafter, a method for manufacturing the first side frame 2 will be mainly described.

First, the first side frame 2 is extruded so as to have the closed cross-section portion 10 in the cross-section perpendicular to the vehicle vertical direction. At the time of this extruding, the groove portions 13a and 14a recessed inward of the closed cross-section portion 10 are also formed in the pair of side walls 13 and 14. Next, the upper end portion 2a of the first side frame 2 is crushed rearward of the vehicle. At this time, the lower end portion 2b is not crushed, and maintains the shape at the time of extruding. Thus, the thickness of the upper end portion 2a in the vehicle front-rear direction is made smaller than that of the lower end portion 2b (D1<D2 in FIG. 2). Then, the second side frame 3, the upper frame 4, the lower frame 5, the midframe 6, the upper bracket 7, the recliner 8, and the like are combined with the first side frame 2 to form the seat back frame 1 (see FIG. 1).

According to the seat back frame 1 of the present embodiment, the following effects are obtained.

Since the first side frame 2 has the closed cross-section portion 10, the first side frame 2 has high load-bearing performance. Further, since the upper end portion 2a of the first side frame 2 is crushed rearward of the vehicle, it is possible to secure a large space above a seat surface and to easily get on and off the vehicle. Furthermore, the lower end portion 2b of the first side frame 2 is fixed, the upper bracket 7 is disposed at the upper end portion 2a. When a high load is applied in a substantially forward direction of the vehicle through the upper bracket 7, a relatively high bending moment is applied to the lower end portion 2b, and a relatively low bending moment is applied to the upper end portion 2a. By crushing the upper end portion 2a rearward of the vehicle without crushing the lower end portion 2b, section modulus of the lower end portion 2b can be made larger than that of the upper end portion 2a, and required load-bearing performance can be efficiently ensured.

The pair of side walls 13 and 14 are folded inward of the closed cross-section portion 10 along with the crushing at the upper end portion 2a. Therefore, appearance of the first side frame 2 can be maintained, and shape layout required in design can be easily satisfied. Further, even if the load is applied when the automobile suddenly decelerates or collides, the pair of side walls 13 and 14 support each other, so that high load-bearing performance can be ensured.

Since the pair of side walls 13 and 14 are provided with initial irregularities (groove portions 13a and 14a) directed inward of the closed cross-section portion 10, it is possible to suppress the pair of side walls 13 and 14 from being bent outward of the closed cross-section portion 10 when the upper end portion 2a is crushed.

(First Modification)

Figure 5:
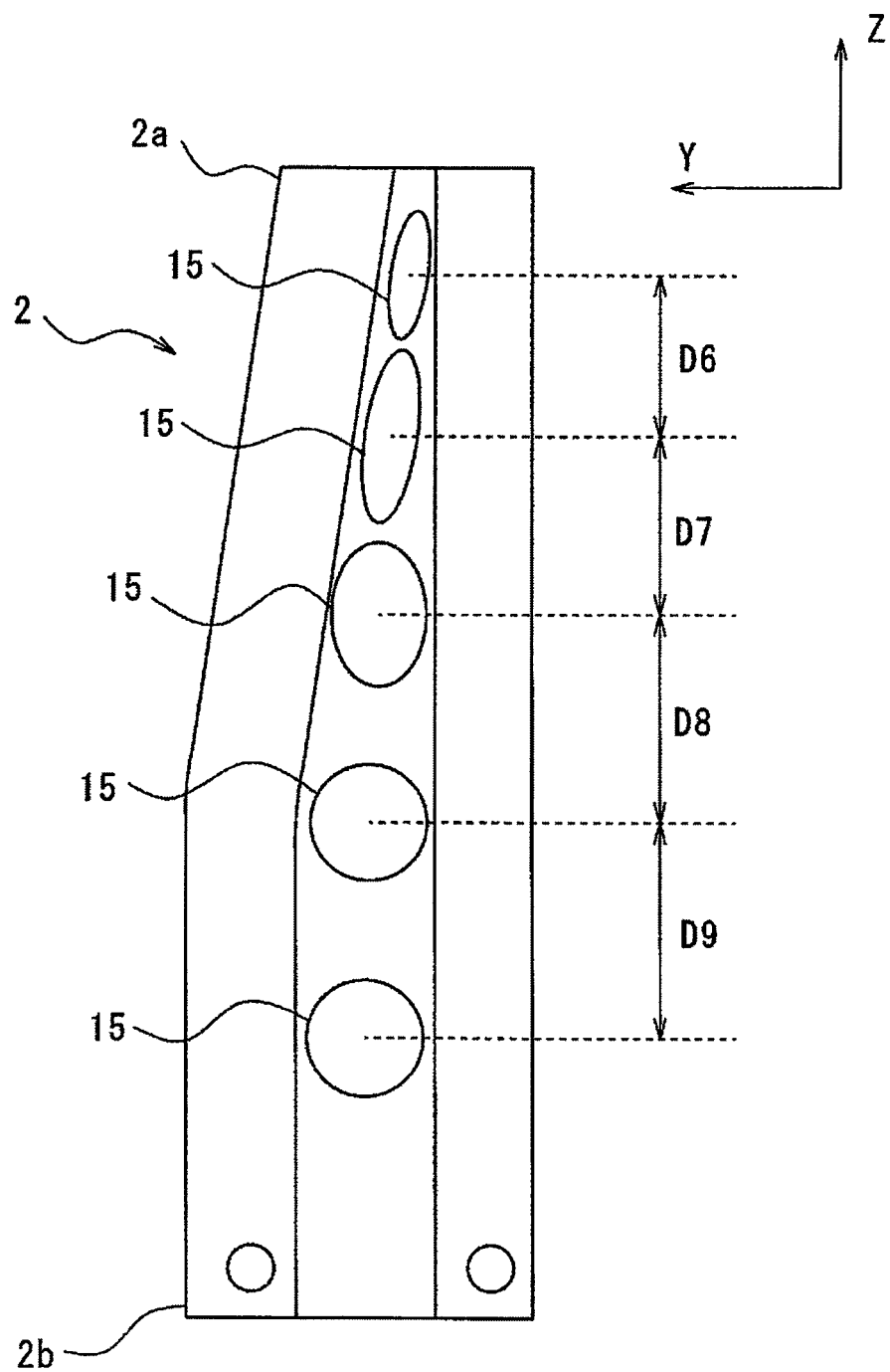
FIG. 5 is a side view illustrating a first modification of the first side frame.

FIG. 5 is a cross-sectional view illustrating a first modification of the first side frame 2 corresponding to FIG. 2.

In the present modification, a plurality of through-holes 15 are provided in the pair of side walls 13 and 14 of the first side frame 2 of the embodiment. Specifically, the plurality of through-holes 15 are provided side by side in the vehicle vertical direction at central portions of the pair of side walls 13 and 14 in the vehicle front-rear direction.

In the present embodiment, each of the plurality of through-holes 15 is circular, and five through-holes 15 are provided. In the upper end portion 2a, the circle is deformed into an ellipse due to crushing processing.

The plurality of through-holes 15 are arranged at a higher density toward an upper side of the vehicle. That is, intervals (distances D6 to D9 between center points) in the vehicle vertical direction in which the plurality of through-holes 15 are arranged are shorter toward the upper side of the vehicle (D6<D7<D8<D9 in FIG. 5). Alternatively, the plurality of through-holes 15 may be arranged at equal intervals and formed larger toward the upper side of the vehicle.

According to the present modification, the weight can be reduced by providing the plurality of through-holes 15. Further, since the plurality of through-holes 15 can disperse the load as compared with a case where one continuous hole is provided, high load-bearing performance can be exhibited. Further, the plurality of through-holes 15 also contribute to facilitating crushing processing at the upper end portion 2a. Furthermore, when the load is applied to the first side frame 2 through the upper bracket 7 when the automobile suddenly decelerates or collides, bending deformation may occur in the first side frame 2, however, since the central portions of the pair of side walls 13 and 14 in the vehicle front-rear direction are located in the vicinity of a neutral axis in the bending deformation, stresses generated in the central portions are small, and it is possible to suppress a decrease in strength even when the plurality of through-holes 15 are provided.

In addition, by increasing arrangement density of the plurality of through-holes 15 toward the upper side of the vehicle, section modulus of the lower portion of the first side frame 2 can be made larger than that of the upper portion, and the required load-bearing performance can be efficiently ensured.

(Second Modification)

Figure 6:
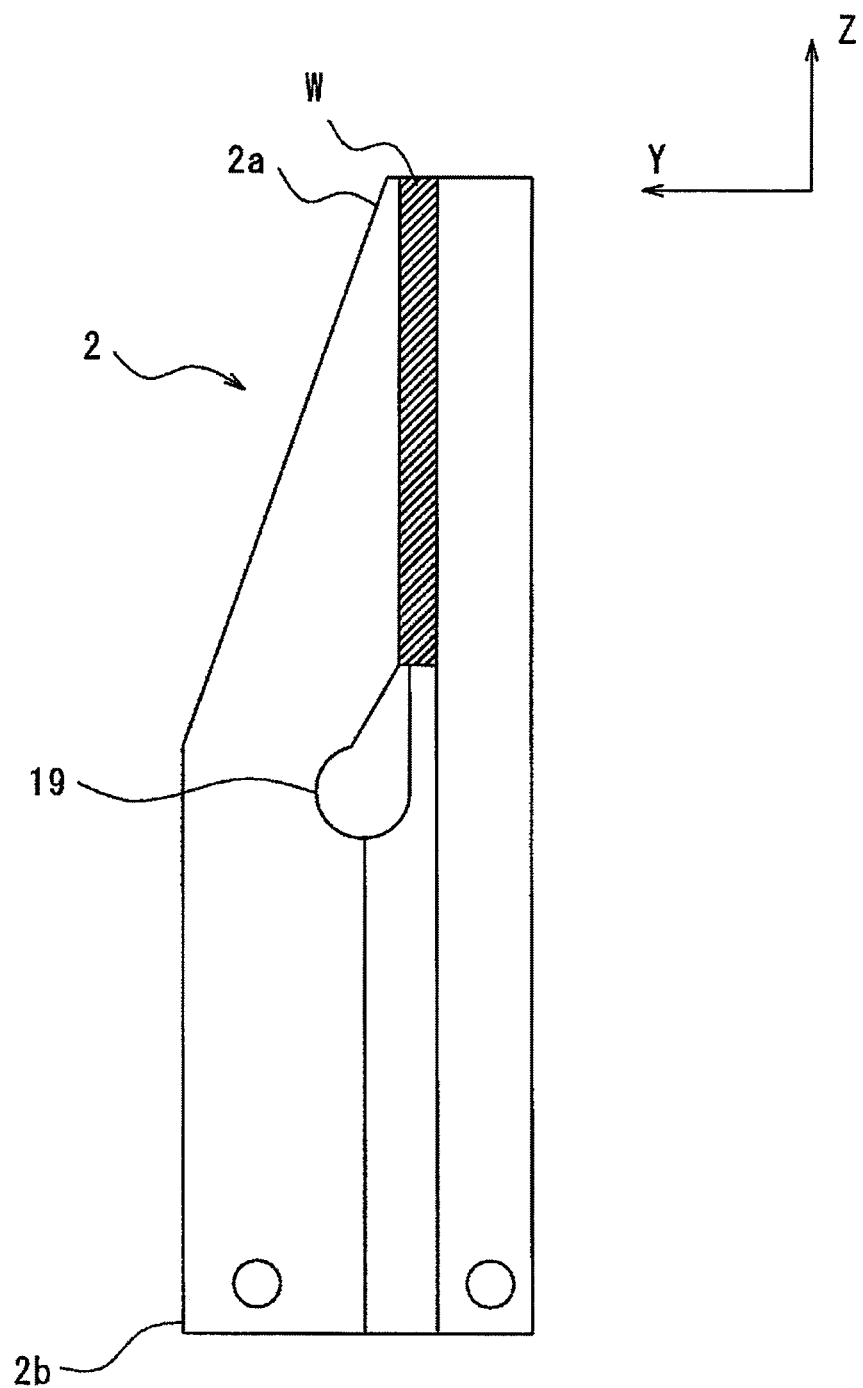
FIG. 6 is a side view illustrating a second modification of the first side frame.

FIG. 6 is a cross-sectional view illustrating a second modification of the first side frame 2 corresponding to FIG. 2.

In the present modification, not only the upper end portion 2a of the first side frame 2 is simply crushed, but also the upper end portion 2a is partially cut off, and the upper end portion 2a is crushed so as to connect the cut portion and continuously welded (see a shaded region W in FIG. 6). Here, continuous welding means welding linearly instead of welding in points as in spot welding.

FIGS. 7 to 10 respectively illustrate first to fourth step diagrams of the method for manufacturing the first side frame 2 of the present modification. In FIGS. 7 to 10, the side view is illustrated at the center, a top view is illustrated at the top, and a bottom view is illustrated at the bottom. Note that shapes of an upper end surface and a lower end surface are respectively illustrated in the top view and the bottom view.

Figure 7:
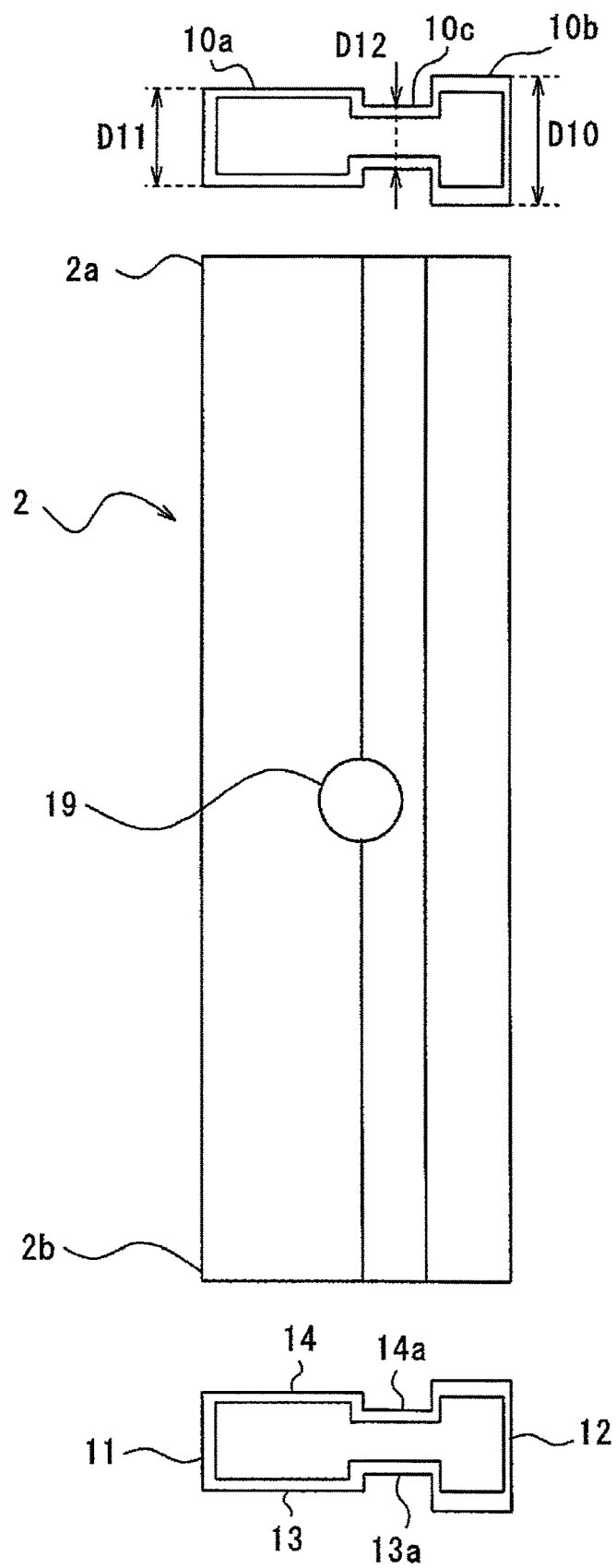
FIG. 7 is a first step diagram of a method for manufacturing the first side frame of FIG. 6.

Referring to FIG. 7 illustrating the first step, the first side frame is extruded so as to have the closed cross-section portion 10 in the cross-section perpendicular to the vehicle vertical direction. In the present modification, the closed cross-section portion 10 includes the rear portion 10b, the front portion 10a, and the intermediate portion 10c in descending order of size in the vehicle width direction (D10>D11>D12 in FIG. 7). In this step, the upper end portion 2a and the lower end portion 2b have the same shape. Further, after extruding, a starting point hole 19 is formed in the pair of side walls 13 and 14. In the illustrated example, the starting point hole 19 is circular and is provided substantially at the center in the vehicle vertical direction.

Figure 8:
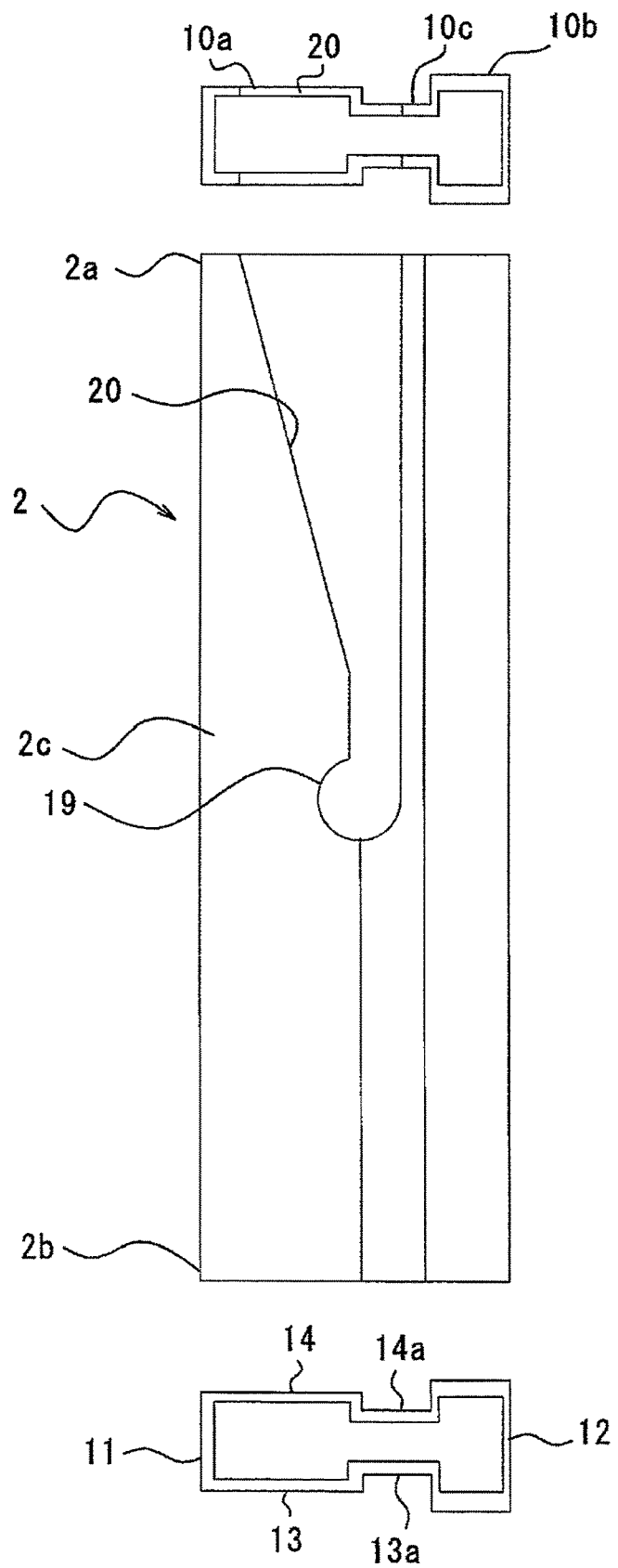
FIG. 8 is a second step diagram of the method for manufacturing the first side frame of FIG. 6.

Referring to FIG. 8 illustrating the second step, an opening 20 increasing in opening amount toward the upper side of the vehicle is formed in the upper end portion 2a of the first side frame 2. In the illustrated example, the opening 20 is provided from the upper end portion 2a to the central portion 2c. The opening 20 has a right triangle shape starting from the starting point hole 19 and having one side at the upper end. Thus, the intermediate portion 10c is removed at the upper end portion 2a.

Figure 9:
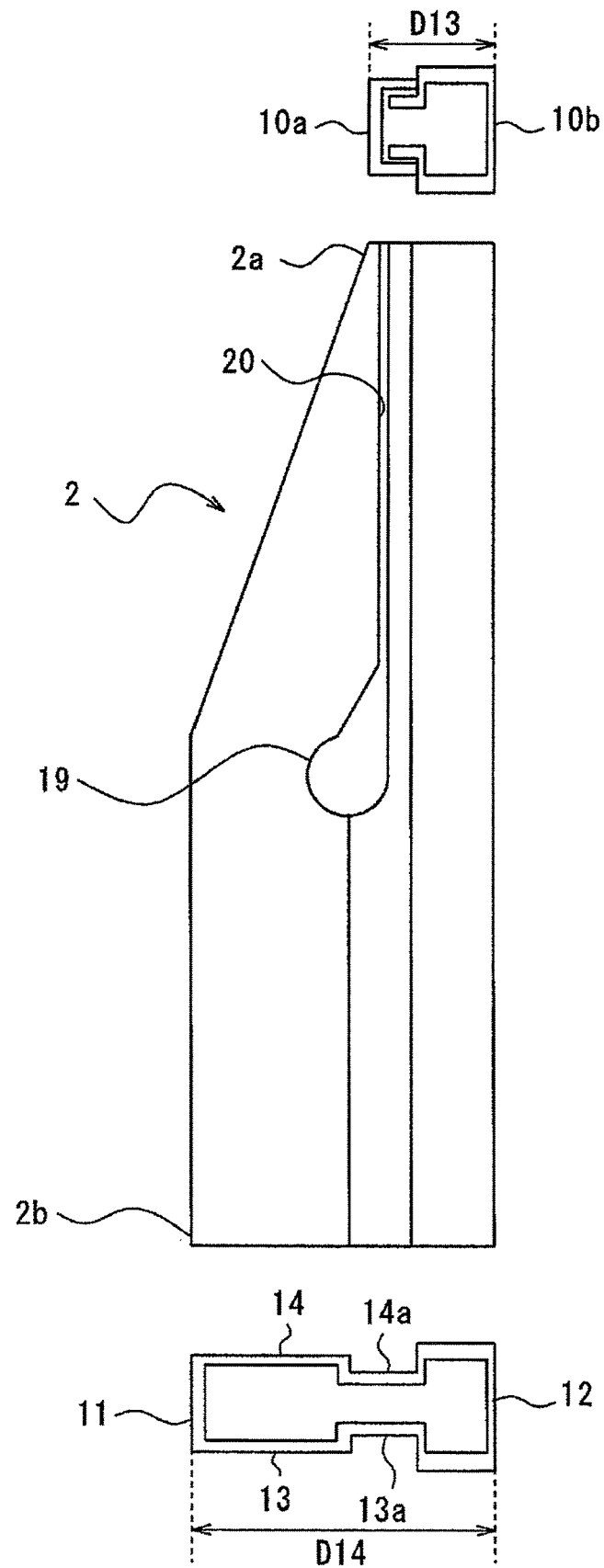
FIG. 9 is a third step diagram of the method for manufacturing the first side frame of FIG. 6.

Referring to FIG. 9 illustrating the third step, the upper end portion 2a is crushed rearward of the vehicle so that the front portion 10a and the rear portion 10b are brought into contact with each other and the opening 20 is closed. At this time, the lower end portion 2b maintains the shape at the time of extruding without being crushed. Thus, the thickness of the upper end portion 2a in the vehicle front-rear direction is smaller than that of the lower end portion 2b (D13<D14 in FIG. 9).

Figure 10:
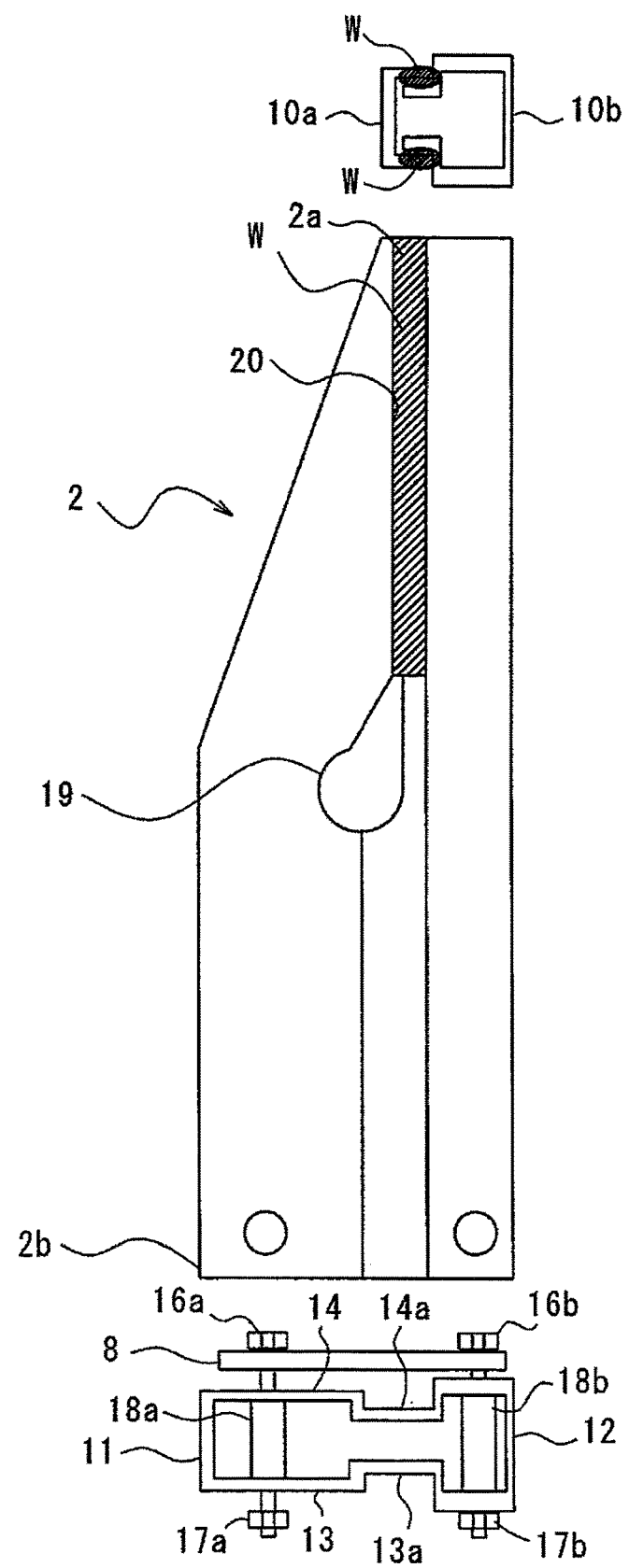
FIG. 10 is a fourth step diagram of the method for manufacturing the first side frame of FIG. 6.

Referring to FIG. 10 illustrating the fourth step, the front portion 10a and the rear portion 10b are continuously welded at the upper end portion 2a (see a shaded region W in FIG. 10). In the illustrated example, the front portion 10a and the rear portion 10b are linearly welded in the vehicle vertical direction. Then, the second side frame 3, the upper frame 4, the lower frame 5, the midframe 6, the upper bracket 7, the recliner 8, and the like are combined with the first side frame 2 to form the seat back frame 1 (see FIG. 1).

According to the present modification, since the upper end portion 2a can be crushed so as to press the front portion 10a against the rear portion 10b, crushing processing and the subsequent welding processing can be easily performed.

Further, the weight can be reduced by forming the opening 20. Further, since the opening amount of the opening 20 is adjusted so that the section modulus is higher toward the lower side of the vehicle, the required load-bearing performance can be efficiently ensured. Note that even when the opening 20 is closed by welding, weight reduction and high load-bearing performance are provided. Furthermore, in the case of the present modification, since the pair of side walls 13 and 14 do not contact each other, they do not support each other, but the load can be transmitted in the vehicle front-rear direction through the side walls 13 and 14, and high load-bearing performance can be ensured.

Although specific embodiments of the present disclosure and modifications thereof have been described above, the present disclosure is not limited to the above embodiments, and various modifications can be made within the scope of the present disclosure. For example, an appropriate combination of the contents of the individual embodiments may be an embodiment of the present disclosure.

What is claimed is:

1. A seat back frame for automobile comprising:
a first side frame and a second side frame that are arranged apart from each other in a vehicle width direction;
an upper frame that connects an upper end portion of the first side frame and an upper end portion of the second side frame; and
an upper bracket that is attached to the upper end portion of the first side frame and guides a seat belt,
wherein
the first side frame is an extruded material made of aluminum alloy extending in a vehicle vertical direction, and has a fixed lower end portion,
the first side frame has a closed cross-section portion in a cross-section perpendicular to the vehicle vertical direction, and the upper end portion of the first side frame is crushed in a rearward direction of a vehicle, and a thickness of the upper end portion of the first side frame in a vehicle front-rear direction is smaller than that of the lower end portion of the first side frame.

2. The seat back frame for automobile according to claim 1, wherein
the closed cross-section portion includes a pair of side walls arranged to face each other in the vehicle width direction, and
the pair of side walls are folded inward of the closed cross-section portion along with the crushing at the upper end portion of the first side frame.

3. The seat back frame for automobile according to claim 2, wherein each of the pair of side walls has a groove portion recessed inward of the closed cross-section portion at the lower end portion of the first side frame.

4. The seat back frame for automobile according to claim 2, wherein a plurality of through-holes are provided at central portions of the pair of side walls in the vehicle front-rear direction.

5. The seat back frame for automobile according to claim 4, wherein the plurality of through-holes are arranged at a higher density toward an upper side of the vehicle.

6. The seat back frame for automobile according to claim 1, wherein
the closed cross-section portion includes a rear portion, a front portion, and an intermediate portion in descending order of size in the vehicle width direction at the lower end portion of the first side frame, and
the closed cross-section portion does not have the intermediate portion at the upper end portion of the first side frame, and has the front portion and the rear portion that are welded.

7. A method for manufacturing a seat back frame for automobile including a first side frame and a second side frame that are arranged apart from each other in a vehicle width direction, an upper frame that connects an upper end portion of the first side frame and an upper end portion of the second side frame, and an upper bracket that is attached to the upper end portion of the first side frame and guides a seat belt, the method comprising:
extruding the first side frame made of aluminum alloy so as to have a closed cross-section portion in a cross-section perpendicular to a vehicle vertical direction; and
crushing the upper end portion of the first side frame in a rearward direction of a vehicle, to make a thickness of the upper end portion of the first side frame in a vehicle front-rear direction smaller than that of a lower end portion of the first side frame.

8. The method for manufacturing the seat back frame for automobile according to claim 7, wherein
the closed cross-section portion includes a pair of side walls arranged to face each other in the vehicle width direction, and
in the extruding, a groove portion recessed inward of the closed cross-section portion is formed in the pair of side walls.

9. The method for manufacturing the seat back frame for automobile according to claim 7, further comprising:
forming an opening increasing in opening amount toward an upper side of the vehicle in the upper end portion of the first side frame; and
continuously welding the opening so as to close the opening after the crushing.

10. The seat back frame for automobile according to claim 3, wherein a plurality of through-holes are provided at central portions of the pair of side walls in the vehicle front-rear direction.

11. The seat back frame for automobile according to claim 10, wherein the plurality of through-holes are arranged at a higher density toward an upper side of the vehicle.

12. The seat back frame for automobile according to claim 2, wherein
the closed cross-section portion includes a rear portion, a front portion, and an intermediate portion in descending order of size in the vehicle width direction at the lower end portion of the first side frame, and
the closed cross-section portion does not have the intermediate portion at the upper end portion of the first side frame, and has the front portion and the rear portion that are welded.

13. The seat back frame for automobile according to claim 3, wherein
the closed cross-section portion includes a rear portion, a front portion, and an intermediate portion in descending order of size in the vehicle width direction at the lower end portion of the first side frame, and
the closed cross-section portion does not have the intermediate portion at the upper end portion of the first side frame, and has the front portion and the rear portion that are welded.

14. The seat back frame for automobile according to claim 4, wherein
the closed cross-section portion includes a rear portion, a front portion, and an intermediate portion in descending order of size in the vehicle width direction at the lower end portion of the first side frame, and
the closed cross-section portion does not have the intermediate portion at the upper end portion of the first side frame, and has the front portion and the rear portion that are welded.

15. The seat back frame for automobile according to claim 5, wherein
the closed cross-section portion includes a rear portion, a front portion, and an intermediate portion in descending order of size in the vehicle width direction at the lower end portion of the first side frame, and
the closed cross-section portion does not have the intermediate portion at the upper end portion of the first side frame, and has the front portion and the rear portion that are welded.

16. The seat back frame for automobile according to claim 10, wherein
the closed cross-section portion includes a rear portion, a front portion, and an intermediate portion in descending order of size in the vehicle width direction at the lower end portion of the first side frame, and
the closed cross-section portion does not have the intermediate portion at the upper end portion of the first side frame, and has the front portion and the rear portion that are welded.

17. The seat back frame for automobile according to claim 11, wherein
the closed cross-section portion includes a rear portion, a front portion, and an intermediate portion in descending order of size in the vehicle width direction at the lower end portion of the first side frame, and
the closed cross-section portion does not have the intermediate portion at the upper end portion of the first side frame, and has the front portion and the rear portion that are welded.

18. The method for manufacturing the seat back frame for automobile according to claim 8, further comprising:
    forming an opening increasing in opening amount toward an upper side of the vehicle in the upper end portion of the first side frame; and
    continuously welding the opening so as to close the opening after the crushing.

\* \* \* \* \*